US009619854B1

(12) United States Patent
Sharifi

(10) Patent No.: US 9,619,854 B1
(45) Date of Patent: Apr. 11, 2017

(54) FINGERPRINT MATCHING FOR RECOMMENDING MEDIA CONTENT WITHIN A VIEWING SESSION

(71) Applicant: Google Inc., Mountain View, CA (US)

(72) Inventor: Matthew Sharifi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 16 days.

(21) Appl. No.: 14/160,073

(22) Filed: Jan. 21, 2014

(51) Int. Cl.
*G06T 1/00* (2006.01)
(52) U.S. Cl.
CPC ............................ *G06T 1/0021* (2013.01)
(58) Field of Classification Search
None
See application file for complete search history.

(56) References Cited

U.S. PATENT DOCUMENTS

| | | | | |
|---|---|---|---|---|
| 8,023,757 | B2* | 9/2011 | Neogi | 382/245 |
| 2009/0052784 | A1* | 2/2009 | Covell et al. | 382/209 |
| 2009/0154806 | A1* | 6/2009 | Chang et al. | 382/173 |
| 2009/0222857 | A1* | 9/2009 | Nagano | H04N 7/173 18 725/40 |
| 2012/0059954 | A1* | 3/2012 | Gilson | 709/246 |
| 2012/0183173 | A1* | 7/2012 | Li et al. | 382/100 |
| 2013/0132982 | A1* | 5/2013 | Xue et al. | 725/9 |
| 2013/0132988 | A1* | 5/2013 | Lee et al. | 725/14 |

FOREIGN PATENT DOCUMENTS

CN 102495873 * 6/2012

OTHER PUBLICATIONS

Baluja, et al., "Content Fingerprinting Using Wavelets," 10 pages.
Ioffe, S., "Improved Consistent Sampling, Weighted Minhash and L1 Sketching," 10 pages.
Media Hedge, "Digital Fingerprinting," White Paper, Civolution and Gracenote, 2010, 12 pages.
Milano, Dominic, "Content Control: Digital Watermarking and Fingerprinting," White Paper, Rhozet, a business unit of Harmonic Inc., 11 pages.
Lu, Jian, "Video fingerprinting for copy identification: from research to industry applications," Proceedings of SPIE—Media Forensics and Security XI, vol. 7254, Jan. 2009, 16 pages.
Lu, Jian, "Video Fingerprinting and Applications: a review," Media Forensics & Security Conference, 2009, San Jose, CA, 31 pages.

* cited by examiner

*Primary Examiner* — Gandhai Thirugnanam
*Assistant Examiner* — Jiangeng Sun
(74) *Attorney, Agent, or Firm* — Fenwick & West LLP

(57) ABSTRACT

Systems and techniques for recommending media content within a viewing session based on fingerprint matching are presented. A media component determines a portion of a consumed video that is consumed by a user during a viewing session. A fingerprint component determines a set of video sub-fingerprints associated with the portion of the consumed video and a set of other video sub-fingerprints associated with a video included in a set of recommended videos. A recommendation component filters the set of recommended videos to generate a filtered set of recommended videos based on a comparison between the set of video sub-fingerprints and the set of other video sub-fingerprints.

11 Claims, 12 Drawing Sheets

FINGERPRINT MATCHING FOR RECOMMENDING MEDIA CONTENT WITHIN A VIEWING SESSION

TECHNICAL FIELD

This disclosure relates generally to fingerprint matching, and more specifically, to fingerprint matching for recommending media content within a viewing session.

BACKGROUND

The internet and media enabled portable computing devices have dramatically altered the processes for generating and consuming media content. Additionally, the convenience of being able to upload, view and/or share media content via the internet, essentially on demand, has resulted in explosive growth of internet media consumption. Presently, users can generate media content using numerous types of devices, e.g., computers, cellular phones, cameras, portable computing devices, etc. Furthermore, users can upload media content from virtually anywhere at any time, as long as they have access to media capable device(s) with an internet connection. For example, millions (if not billions) of people around the world have capability to produce media content, and popular online media services (e.g., service providers) can receive many hours of newly uploaded user-generated content every minute. To assist discovery of media content by users, popular online media services (e.g., service providers) can recommend media content to users. For example, conventional online media services (e.g., service providers) can present a list of media content to a user (e.g., in response to a search by the user, based on interests of the user, etc.). However, in certain instances, duplicate media content can be included in a list of media content presented and/or recommended to a user.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a media component, a fingerprint component and a recommendation component. The media component determines a portion of a consumed video that is consumed by a user during a viewing session. The fingerprint component determines a set of video sub-fingerprints associated with the portion of the consumed video and a set of other video sub-fingerprints associated with a video included in a set of recommended videos. The recommendation component filters the set of recommended videos to generate a filtered set of recommended videos based on a comparison between the set of video sub-fingerprints and the set of other video sub-fingerprints.

Additionally, a non-limiting implementation provides for determining a portion of a consumed video that is consumed by a user during a viewing session, determining a set of video sub-fingerprints associated with the portion of the consumed video and a set of other video sub-fingerprints associated with a video included in a set of recommended videos, and filtering the set of videos to generate a filtered set of recommended videos based on a comparison between the set of video sub-fingerprints and the set of other video sub-fingerprints.

In accordance with another implementation, a non-transitory computer readable storage medium comprising computer-executable instructions, that in response to execution, cause a computing system to perform operations, comprising: determining a portion of a consumed video that is consumed by a user during a viewing session, determining a set of video sub-fingerprints associated with the portion of the consumed video and a set of other video sub-fingerprints associated with a video included in a set of recommended videos, and filtering the set of videos to generate a filtered set of recommended videos based on a comparison between the set of video sub-fingerprints and the set of other video sub-fingerprints.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
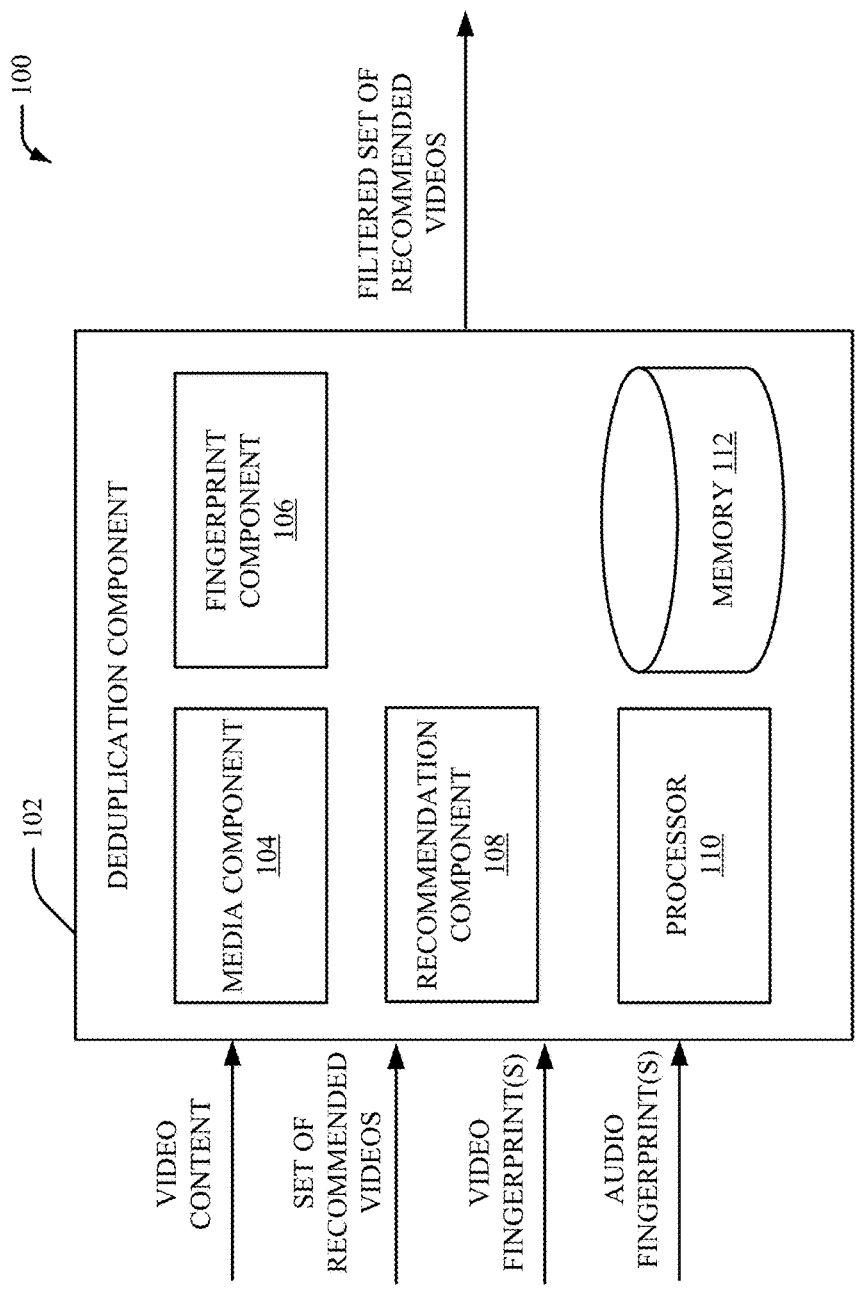
FIG. 1 illustrates a high-level block diagram of an example deduplication component for recommending media content within a viewing session based on fingerprint matching, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The internet and media enabled portable computing devices have dramatically altered the processes for generating and consuming media content. Additionally, the convenience of being able to upload, view and/or share media content via the internet, essentially on demand, has resulted in explosive growth of internet media consumption. Presently, users can generate media content using numerous types of devices, e.g., computers, cellular phones, cameras, portable computing devices, etc. Furthermore, users can upload media content from virtually anywhere at any time, as long as they have access to media capable device(s) with an internet connection. For example, millions (if not billions) of people around the world have capability to produce media content, and popular online media services (e.g., service providers) can receive many hours of newly uploaded user-generated content every minute. To assist discovery of media content by users, popular online media services (e.g., service providers) can recommend media content to users. For example, conventional online media services (e.g., service providers) can present a list of media content to a user (e.g., in response to a search by the user, based on interests of the user, etc.). However, in certain instances, duplicate media content can be included in a list of media content presented and/or recommended to a user.

To that end, techniques for implementing fingerprint matching to recommend media content within a viewing session are presented. For example, duplicate media content between a set of media content and consumed media content during a viewing session can be detected and/or filtered based at least in part on video fingerprints and/or audio fingerprints. In an aspect, a set of videos and/or portions of videos that a user has watched during a viewing session (e.g., an interval of time associated with browsing and/or watching media content via a media sharing service) can be determined. Therefore, each video in a set of recommended videos can be compared to each video and/or each portion of video that is consumed by the user during the viewing session based on fingerprint matching. Furthermore, one or more videos from the set of recommended videos that are identified as matching video content consumed during the viewing session (e.g., based on the fingerprint matching) can be filtered from the set of recommended videos. In a non-limiting example, once a user has watched a portion (e.g., a segment) of a first video and an entire second video, a set of videos (e.g., a set of recommended videos) can be filtered based on fingerprint matching so that the portion of the first video (e.g., the segment of the first video) and the entire second video is not included in the set of videos (e.g., the set of recommended videos). As such, fingerprint matching can be implemented to facilitate filtering of recommended media content within a viewing session. Accordingly, recommending duplicate media content to a user can be avoided (e.g., recommending media content that partially and/or fully overlaps with media content recently consumed by a user can be avoided). Furthermore, uniqueness of media content that is recommended to a user can be improved.

Referring initially to FIG. 1, there is illustrated an example system 100 that can implement fingerprint matching to recommend media content within a viewing session, according to an aspect of the subject disclosure. In one example, the system 100 can be implemented on or in connection with a server that hosts user-uploaded media content. The system 100 can be employed by various systems, such as, but not limited to deduplication systems, audio and/or video matching systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, and the like.

Specifically, the system 100 can provide a deduplication component with a media feature (e.g., media component 104), a fingerprint feature (e.g., fingerprint component 106) and a recommendation feature (e.g., recommendation component 108) that can be utilized in, for example, a media content application (e.g., a media recommendation application). The media feature can determine at least a portion of a consumed video that is consumed by a user during a viewing session. The fingerprint feature can determine a set of video sub-fingerprints associated with the portion of the consumed video and a set of other video sub-fingerprints associated with a video included in a set of recommended videos. The recommendation feature can filter the set of recommended videos to generate a filtered set of recommended videos based on a comparison between the set of video sub-fingerprints and the set of other video sub-fingerprints.

In particular, the system 100 can include a deduplication component 102. In FIG. 1, the deduplication component 102 includes a media component 104, a fingerprint component 106 and a recommendation component 108. In one example, the system 100 can be implemented in an audio and/or video matching system. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100.

The deduplication component 102 (e.g., the media component 104) can receive video content (e.g., VIDEO CONTENT shown in FIG. 1). The video content can be a video file (e.g., a consumed video) that is consumed by a user (e.g., a user identity). For example, the user (e.g., the user identity) can be a user of a media sharing platform (e.g., a user identity associated with a media sharing platform). In an aspect, the media component 104 can determine at least a portion of the video file (e.g., a segment of the video file, an entire portion of the video file, etc.) that is consumed by the user. For example, the media component 104 can determine an interval of time (e.g., time A to time B where A and B are time values, frame C to frame D where C and D are integer values, start to finish, etc.) associated with the video file that is consumed by the user. In an aspect, the media component 104 can determine at least a portion of the video file that is consumed by the user during a viewing session. A viewing session can include an interval of time that a user (e.g., a user identity) spends browsing and/or watching a sequence of videos. In an aspect, a viewing session can include a plurality of viewing sessions. For example, a viewing session can comprise a set of related viewing sessions (e.g., a plurality of viewing sessions that can be correlated based on an interval of time between viewing sessions).

In an aspect, the video content (e.g., the video file) can be uploaded media content (e.g., media content uploaded to a media sharing platform). It is to be appreciated that the video content (e.g., the video file) can be in any recognizable media file format (e.g., video file format and/or audio file format), codec compression format, etc. In another aspect, the video content received by the deduplication component 102 (e.g., the media component 104) can include each video file consumed by a user within a viewing session. As such, in an aspect, the video content received by the deduplication component 102 (e.g., the media component 104) can include one or more video files.

In another aspect, the media component 104 can store (e.g., maintain a data list that includes) an identifier and/or a viewed range for videos consumed by a user during a viewing session. For example, the media component 104 can store a first identifier and/or a first viewed range for a first consumed video file, a second identifier and/or a second viewed range for a second consumed video file, etc. In one example, a consumed video (e.g., a consumed video content, a consumed video file, etc.) can be at least a portion of a video that is watched by the user (e.g., viewed by the user, streamed on a media playback device associated with the user, decoded by a media playback device associated with the user, etc.). In another example, a consumed video can be a video that is recommended to the user (e.g., presented and/or displayed on a media playback device associated with the user) a certain number of times without the user watching the video.

The fingerprint component 106 can implement fingerprint matching to facilitate audio matching and/or video matching (e.g., to identify matching video content). Audio matching provides for identification of a recorded audio sample (e.g., an audio track of a video file) by comparing the audio sample to a set of reference samples. For example, an audio sample can be transformed to a time-frequency representation (e.g., by employing a short time Fourier transform). Using a time-frequency representation, interest points that characterize time and frequency locations of peaks and/or other distinct patterns of a spectrogram can be extracted from the audio sample. As such, an audio fingerprint can be computed as a function of a set of interest points. In an example, an audio fingerprint can be generated based at least in part on a hash of a spectrogram window (e.g., a min-hash technique). In another example, a combination of computer vision techniques and/or data stream processing algorithms can be implemented to generate an audio fingerprint. In yet another example, an audio fingerprint can be generated based at least in part on wavelets (e.g., one or more wavelet vectors). However, it is to be appreciated that an audio fingerprint can be generated by employing different techniques. Audio fingerprints of the audio sample can then be compared to audio fingerprints of reference samples to determine identity of the audio sample (e.g., an audio track associated with video content).

Video matching works similarly to audio matching in that it provides for identification of a recorded video sample by comparing video frames features of the video sample to a set of reference video features related to a set of reference videos. For example, a set of mean frames of the video sample can be identified based on a sliding time window over the video sample. Unique video features based on the set of mean frames can then be identified. As such, a video fingerprint can be generated based on unique video features identified through the set of mean frames. In an example, a video fingerprint can be generated based at least in part on a hash of a spectrogram window (e.g., a min-hash technique). In another example, a combination of computer vision techniques and/or data stream processing algorithms can be implemented to generate a video fingerprint. In yet another example, a video fingerprint can be generated based at least in part on wavelets (e.g., one or more wavelet vectors). However, it is to be appreciated that a video fingerprint can be generated by employing different techniques. Video fingerprints of the video sample can then be compared to video fingerprints of reference videos to determine the identity of the video sample (e.g., video content). As such, the fingerprint component 106 can employ fingerprints (e.g., video fingerprints and/or audio fingerprints) to identify matching video content. Accordingly, the fingerprint component 106 can receive one or more video fingerprints (e.g., VIDEO FINGERPRINT(S) shown in FIG. 1) and/or one or more audio fingerprints (e.g., AUDIO FINGERPRINT(S) shown in FIG. 1).

The fingerprint component 106 can employ fingerprint matching to compare the portion of the consumed video (e.g., determined by the media component 104) with a video included in a set of videos (e.g., a set of recommended videos). For example, the media component 104 and/or the recommendation component can generate and/or receive a set of videos (e.g., SET OF RECOMMENDED VIDEOS shown in FIG. 1). For example, one or more videos included in the set of videos (e.g., the set of recommended videos) can be a video to recommend to a user (e.g., to present on a media playback device associated with a user). In an aspect, one or more videos included in the set of videos (e.g., content of one or more videos included in the set of videos, a topic and/or subject matter associated with one or more videos included in the set of videos, etc.) can be related to the consumed video. In another aspect, the consumed video can be associated with and/or included in the set of recommended videos.

In an aspect, the fingerprint component 106 can compare the portion of the consumed video (e.g., determined by the media component 104) with a video included in a set of videos (e.g., a set of recommended videos) based on video sub-fingerprints and/or audio sub-fingerprints (e.g., the fingerprint component 106 can compare video sub-fingerprints and/or audio sub-fingerprints). For example, a video fingerprint and/or an audio fingerprint can be a time series of strings. Each string can include a plurality of bytes (e.g., 10 bytes, 100 bytes, etc.). A string can represent a portion of a video signal (e.g., a video file) and/or an audio signal (e.g., an audio file) around a certain time period of the video signal and/or the audio signal (e.g., between 400 milliseconds and 600 milliseconds of the video file and/or the audio file, etc.). Furthermore, a video fingerprint and/or an audio fingerprint can comprise a sequence of sub-fingerprints. Therefore, a video fingerprint and/or an audio fingerprint can be composed of a time-based series of sub-fingerprints. Video sub-fingerprints can be equally sized encoded portions of a video file. For example, video sub-fingerprints can be a string of equally sized encoded portions of a video signal (e.g., a video file) at a given localized window of time. Similarly, audio sub-fingerprints can be equally sized encoded portions of an audio file. For example, audio sub-fingerprints can be a string of equally sized encoded portions of an audio signal (e.g., an audio file) at a given localized window of time.

As such, the fingerprint component 106 can determine a set of video sub-fingerprints associated with the portion of the consumed video (e.g., a set of video sub-fingerprints for each video consumed during a viewing session). For example, the fingerprint component 106 can determine the set of video sub-fingerprints based on a video fingerprint (e.g., a previously generated video fingerprint) associated with the consumed video. The video fingerprint can be generated based on the consumed video (e.g., an entire portion of the consumed video). Furthermore, the video fingerprint can comprise at least the set of video sub-fingerprints. Therefore, a time interval of the set of video sub-fingerprints can correspond to a time interval related to the portion of the consumed video (e.g., a segment of the video fingerprint that corresponds to a consumed portion of video). In one example, the fingerprint component 106 can determine the set of video sub-fingerprints associated with the portion of the consumed video based on an index (e.g., a hash index) associated with the video fingerprint and/or the consumed video. However, it is to be appreciated that the fingerprint component 106 can implement a different technique and/or employ other data to determine the set of video sub-fingerprints associated with the portion of the consumed video.

Additionally or alternatively, the fingerprint component 106 can determine a set of audio sub-fingerprints associated with the portion of the consumed video (e.g., a set of audio sub-fingerprints for each video consumed during a viewing session). For example, the fingerprint component 106 can determine the set of audio sub-fingerprints based on an audio fingerprint (e.g., a previously generated audio fingerprint) associated with the consumed video. The audio fingerprint can be generated based on the consumed video (e.g., an entire portion of the consumed video). Furthermore, the audio fingerprint can comprise at least the set of audio sub-fingerprints. Therefore, a time interval of the set of audio sub-fingerprints can correspond to a time interval related to the portion of the consumed video (e.g., a segment of the audio fingerprint that corresponds to the portion of the consumed video). In one example, the fingerprint component 106 can determine the set of audio sub-fingerprints associated with the portion of the consumed video based on an index (e.g., a hash index) associated with the audio fingerprint and/or the consumed video. However, it is to be appreciated that the fingerprint component 106 can implement a different technique and/or employ other data to determine the set of audio sub-fingerprints associated with the portion of the consumed video.

Additionally, the fingerprint component 106 can determine a set of other video sub-fingerprints associated with the video included in the set of videos (e.g., a set of other video sub-fingerprints for each video included in the set of videos). For example, the fingerprint component 106 can determine the set of other video sub-fingerprints based on another video fingerprint (e.g., another previously generated video fingerprint) associated with the video included in the set of videos (e.g., the set of recommended videos). The other video fingerprint can be generated based on the video included in the set of videos (e.g., an entire portion of the video included in the set of videos). Additionally, the set of other video sub-fingerprints can correspond to an entire portion of the other video fingerprint. Therefore, a time interval of the set of other video sub-fingerprints can correspond to a time interval related to an entire portion of the other video fingerprint. In one example, the fingerprint component 106 can determine the set of other video sub-fingerprints associated with the video included in the set of videos (e.g., the set of recommended videos) based on an index (e.g., a hash index) associated with the other video fingerprint and/or the video included in the set of videos (e.g., the set of recommended videos). However, it is to be appreciated that the fingerprint component 106 can implement a different technique and/or employ other data to determine the set of other video sub-fingerprints associated with the video included in the set of videos (e.g., the set of recommended videos).

Additionally or alternatively, the fingerprint component 106 can determine a set of other audio sub-fingerprints associated with the video included in the set of videos (e.g., a set of other audio sub-fingerprints for each video included in the set of videos). For example, the fingerprint component 106 can determine the set of other audio sub-fingerprints based on another audio fingerprint (e.g., another previously generated audio fingerprint) associated with the video included in the set of videos (e.g., the set of recommended videos). The other audio fingerprint can be generated based on the video included in the set of videos (e.g., an entire portion of the video included in the set of videos). Additionally, the set of other audio sub-fingerprints can correspond to an entire portion of the other audio fingerprint. Therefore, a time interval of the set of other audio sub-fingerprints can correspond to a time interval related to an entire portion of the other audio fingerprint. In one example, the fingerprint component 106 can determine the set of other audio sub-fingerprints associated with the video included in the set of videos (e.g., the set of recommended videos) based on an index (e.g., a hash index) associated with the other audio fingerprint and/or the video included in the set of videos (e.g., the set of recommended videos). However, it is to be appreciated that the fingerprint component 106 can implement a different technique and/or employ other data to determine the set of other audio sub-fingerprints associated with the video included in the set of videos (e.g., the set of recommended videos).

In an aspect, the fingerprint component 106 can receive the video fingerprint, the audio fingerprint, the other video fingerprint and/or the other audio fingerprint (e.g., from a different fingerprint component). In another aspect, the video fingerprint, the audio fingerprint, the other video fingerprint and/or the other audio fingerprint can be generated (e.g., previously generated) by the fingerprint component 106. In another aspect, the set of video sub-fingerprints can corresponds to a portion of a video fingerprint associated with the consumed video and the set of other video sub-fingerprints can correspond to an entire video fingerprint associated with the video included in the set of videos (e.g., the set of recommended videos). Additionally or alternatively, the set of audio sub-fingerprints can corresponds to a portion of an audio fingerprint associated with the consumed video and the set of other audio sub-fingerprints can correspond to an entire audio fingerprint associated with the video included in the set of videos (e.g., the set of recommended videos).

The recommendation component 108 can filter the set of videos (e.g., the set of recommended videos) to generate a filtered set of videos (e.g., a filtered set of recommended videos). In an aspect, the recommendation component 108 can filter the set of videos (e.g., the set of recommended videos) to generate a filtered set of videos (e.g., a filtered set of recommended videos) based on a comparison between the set of video sub-fingerprints and the set of other video sub-fingerprints. For example, the recommendation component 108 can determine (e.g., compute) similarity between the set of video sub-fingerprints and the set of other video sub-fingerprints. In an example, the recommendation component 108 can determine (e.g., compute) similarity between the set of video sub-fingerprints and the set of other video sub-fingerprints based on, but not limited to, a hamming similarity function (e.g., bit sampling for hamming distance), a hashing scheme, a grouping scheme, locality-sensitive hashing, a hamming similarity function and/or a min-hash.

Additionally, the recommendation component 108 can further filter the set of videos (e.g., the set of recommended videos) to generate the filtered set of videos (e.g., the filtered set of recommended videos) based on a comparison between the set of audio sub-fingerprints and the set of other audio sub-fingerprints. For example, the recommendation component 108 can determine (e.g., compute) similarity between the set of audio sub-fingerprints and the set of other audio sub-fingerprints. In an example, the recommendation component 108 can determine (e.g., compute) similarity between the set of audio sub-fingerprints and the set of other audio sub-fingerprints based on, but not limited to, a hamming similarity function (e.g., bit sampling for hamming distance), a hashing scheme, a grouping scheme, locality-sensitive hashing, a hamming similarity function and/or a min-hash. As such, a match between video sub-fingerprints (e.g., between the set of video sub-fingerprints and the set of other video sub-fingerprints) and corresponding audio sub-fingerprints (e.g., between the set of audio sub-fingerprints and the set of other audio sub-fingerprints) can correspond to stronger similarity (e.g., a stronger match, a more confident match, etc.). In an aspect, the recommendation component 108 can generate a similarity score (e.g., a similarity value) for the video included in the set of videos (e.g., the filtered set of videos) based on the comparison between the set of video sub-fingerprints and the set of other video sub-fingerprints and/or the comparison between the set of audio sub-fingerprints and the set of other audio sub-fingerprints. As such, the recommendation component 108 can modify the set of videos (e.g., the filtered set of videos) based similarity scores associated with videos included in the set of videos (e.g., the filtered set of videos). For example, the recommendation component 108 can modify a ranking of videos in the set of videos (e.g., the filtered set of videos) based similarity scores associated with the videos included in the set of videos (e.g., the filtered set of videos).

The recommendation component can recommend the filtered set of videos (e.g., the filtered set of recommended videos) to the user (e.g., the user that consumed the portion of the video). For example, the recommendation component can transmit the filtered set of videos (e.g., FILTERED SET OF RECOMMENDED VIDEOS shown in FIG. 1) to a media playback device (e.g., via a network). In one example, the recommendation component can present the filtered set of videos (e.g., the filtered set of recommended videos) on a media playback device associated with the user. Accordingly, recommending duplicate media content to the user can be avoided (e.g., recommending media content that partially and/or fully overlaps with media content recently consumed by the user during the viewing session can be avoided). Furthermore, uniqueness of media content that is recommended to the user can be improved.

In an aspect, the media component 104 can further determine a portion of a different consumed video that is consumed by the user during the viewing session, the fingerprint component 106 can further determine a different set of video sub-fingerprints associated with the portion of the different consumed video and/or a different set of audio sub-fingerprints associated with the portion of the different consumed video, and the recommendation component 108 can further filter the set of recommended videos to generate the filtered set of recommended videos based on a comparison between the different set of video sub-fingerprints and the set of other video sub-fingerprints and/or a comparison between the different set of audio sub-fingerprints and the set of other audio sub-fingerprints. For example, the recommendation component 108 can filter the set of recommended videos to generate the filtered set of recommended videos by comparing the set of video sub-fingerprints and the different set of video sub-fingerprints associated with consumed video (e.g., during the viewing session) with the set of other video sub-fingerprints associated with the set of recommended videos. Additionally or alternatively, the recommendation component 108 can filter the set of recommended videos to generate the filtered set of recommended videos by comparing the set of audio sub-fingerprints and the different set of audio sub-fingerprints associated with consumed video (e.g., during the viewing session) with the set of other audio sub-fingerprints associated with the set of recommended videos. As such, a plurality of videos consumed during a viewing session (e.g., four videos, ten videos, etc.) can be compared with each video in a set of videos (e.g., a set of recommended videos) based on corresponding video sub-fingerprints and/or corresponding audio sub-fingerprints. Furthermore, the set of videos (e.g., the set of recommended videos) can be filtered and/or modified based on the comparison of corresponding video sub-fingerprints and/or corresponding audio sub-fingerprints.

While FIG. 1 depicts separate components in system 100, it is to be appreciated that the components may be implemented in a common component. In one example, the media component 104, the fingerprint component 106 and/or the recommendation component 108 can be included in a single component. Further, it can be appreciated that the design of system 100 can include other component selections, component placements, etc., to facilitate recommending media content (e.g., within a viewing session) based on fingerprint matching.

Figure 2:
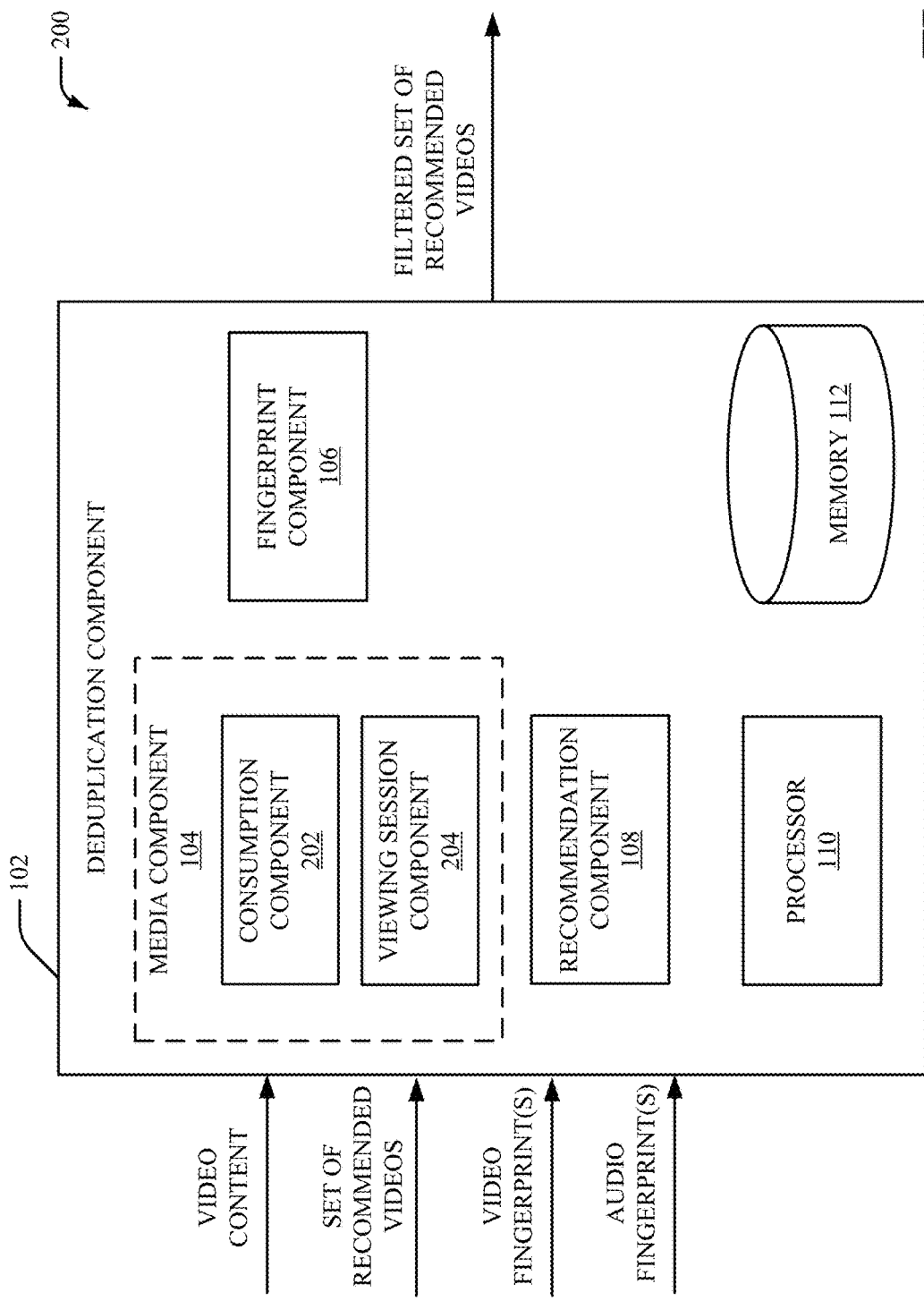
FIG. 2 illustrates a high-level block diagram of another example deduplication component for recommending media content within a viewing session based on fingerprint matching, in accordance with various aspects and implementations described herein.

Referring to FIG. 2, there is illustrated a non-limiting implementation of a system 200 in accordance with various aspects and implementations of this disclosure. The system 200 includes the deduplication component 102. The deduplication component 102 can include the media component 104, the fingerprint component 106 and the recommendation component 108. The media component 104 can include a consumption component 202 and a viewing session component 204.

The consumption component 202 can determine (e.g., identify) video content that is consumed by a user (e.g., a user identity). For example, the consumption component 202 can determine (e.g., identify) each video file that is consumed by a user (e.g., a user identity) during a viewing session. In one example, the consumption component 202 can determine video content that is consumed on a media playback device associated with a user. In an aspect, the consumption component 202 can determine an identification value (e.g., an identifier, a tag, etc.) associated with each video file that is consumed by a user.

Additionally, the consumption component 202 can determine a portion of each video file (e.g., a segment of each video) that is consumed by the user. For example, the consumption component 202 can determine an interval of time (e.g., a time range) associated with consumption for each video file that is consumed by the user. As such, the consumption component 202 can determine whether a segment of a particular video file is consumed, an entire portion of (e.g., all of) a particular video file is consumed, etc.

In an aspect, a consumed video can be video content (e.g., a video file) that has been watched (e.g., viewed) by the user (e.g., the user identity). For example, a consumed video can be video content (e.g., a video file) that has been watched (e.g., streamed, played back, processed, decoded, etc.) on a media playback device associated with the user. In another aspect, a consumed video can be video content (e.g., a video file) that has been recommended to the user (e.g., presented to the user on the media playback device) a certain number of times (e.g., a predetermined number of times). For example, a particular video that has been recommended to the user a certain number of times (e.g., three times, five times, etc.) without the user watching the particular video can be considered a consumed video. In another aspect, a consumed video can be determined based at least in part on video content visibility (e.g., display ranking of the video content) when being recommended to the user (e.g., when being present to the user on the media playback device). For example, a particular video that is presented higher in a list of videos presented to a user (e.g., displayed on a media playback device of the user) can correspond to a higher indicator that the user is not interested in the particular video. As such, the certain number of times (e.g., the predetermined number of times) that video content is recommended to a user before being considered consumed video content can be determined based on the visibility of the video content (e.g., the display ranking of the video content) when being previously recommended to the user.

The viewing session component 204 can determine at least one viewing session associated with the user (e.g., the user identity). A viewing session can include an interval of time that the user (e.g., the user identity) spends browsing and/or watching a sequence of videos. In an aspect, a viewing session can include a plurality of viewing sessions. For example, a particular viewing session can be associated with a previous viewing session (e.g., the particular viewing session and the previous viewing session can be considered a single viewing session) in response to a determination that an interval of time between the previous viewing session and the particular viewing session is less than or equal to a predetermined threshold level (e.g., 2 minutes, 10 minutes, 30 minutes, 1 hour, etc.). Accordingly, the viewing session component 204 can additionally calculate and/or determine an interval of time between viewing sessions. Furthermore, the viewing session component 204 can determine whether viewing sessions are related based on an interval of time between viewing sessions. It is to be appreciated that a viewing session can comprise more than two viewing sessions. It is also to be appreciated that each viewing session can be associated with one or more consumed videos. Therefore, a viewing session can be a discontinuous series of viewing sessions. In another aspect, the viewing session component 204 can store (e.g., maintain a data list that includes) an identifier and/or a viewed range for videos consumed by a user during a viewing session. For example, the viewing session component 204 can store a first identifier and/or a first viewed range for a first consumed video file, a second identifier and/or a second viewed range for a second consumed video file, etc. As such, a total number of videos consumed during a viewing session, an identifier associated with each video consumed during a viewing session and/or an interval of time associated with consumption for each video consumed during a viewing session can be determined and/or stored by the viewing session component 204.

Figure 3:
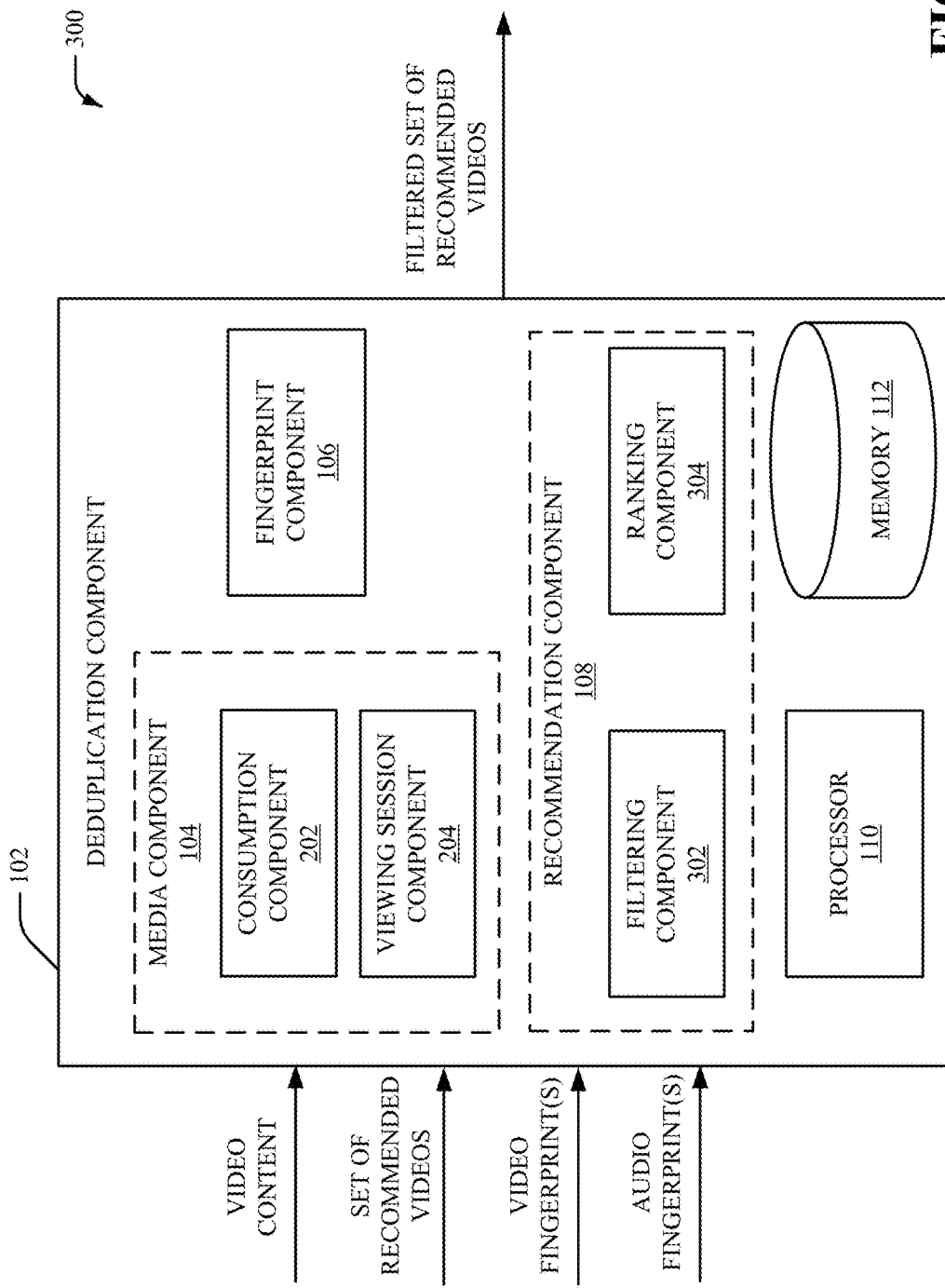
FIG. 3 illustrates a high-level block diagram of yet another example deduplication component for recommending media content within a viewing session based on fingerprint matching, in accordance with various aspects and implementations described herein.

Referring to FIG. 3, there is illustrated a non-limiting implementation of a system 300 in accordance with various aspects and implementations of this disclosure. The system 300 includes the deduplication component 102. The deduplication component 102 can include the media component 104, the fingerprint component 106 and the recommendation component 108. The media component 104 can include the consumption component 202 and the viewing session component 204. The recommendation component 108 can include a filtering component 302 and a ranking component 304.

The filtering component 302 can filter (e.g., modify) a set of videos (e.g., a set of recommended videos). For example, the filtering component 302 can filter (e.g., modify) a set of videos (e.g., a set of recommended videos) based at least in part on fingerprint matching. In an aspect, the filtering component 302 can filter a set of videos based on a comparison between a set of fingerprints (e.g., a set of video fingerprints and/or a set of audio fingerprints) related to a portion of a consumed video and a set of fingerprints (e.g., a set of video fingerprints and/or a set of audio fingerprints) related to a video included in the set of videos (e.g., the set of recommended videos). For example, the filtering component 302 can receive a set of fingerprints (e.g., a set of sub-fingerprints) related to a portion of a consumed video and/or a set of other fingerprints (e.g., a set of other sub-fingerprints) related to a video included in the set of videos (e.g., the set of recommended videos) from the fingerprint component 106.

In one example, the filtering component 302 can filter the set of videos (e.g., the set of recommended videos) by comparing a set of video sub-fingerprints related to the portion of the consumed video with a set of other video sub-fingerprints related to at least one video included in the set of videos (e.g., the set of recommended videos). Additionally, the filtering component 302 can filter the set of videos (e.g., the set of recommended videos) by comparing a set of audio sub-fingerprints related to the portion of the consumed video with a set of other audio sub-fingerprints related to at least one video included in the set of videos (e.g., the set of recommended videos). As such, the filtering component 302 can filter the set of videos (e.g., the set of recommended videos) to generate a filtered set of videos (e.g., a filtered set of recommended videos). In an aspect, the filtering component 302 can remove one or more videos from the set of videos (e.g., the set of recommended videos)

to generate the filtered set of videos (e.g., the filtered set of recommended videos). For example, a particular video included in the set of videos (e.g., the set of recommended videos) can be removed from the set of videos in response to a determination by the filtering component 302 that the particular video matches consumed video content (e.g., video content consumed by a user during a viewing session). As such, the filtering component 302 can remove one or more videos from the set of videos (e.g., the set of recommended videos) based on fingerprint matching so that video content that is consumed by a user (e.g., during a viewing session) is not included in the set of videos (e.g., the filtered set of videos).

The ranking component 304 can determine and/or modify a ranking of videos included in the set of videos. For example, the ranking component 304 can determine and/or modify a ranking of videos in the set of videos that are presented to a user (e.g., via media playback device). As such, the ranking component 304 can determine and/or modify an ordering (e.g., a ranking) of videos in the set of videos. In an aspect, the ranking component 304 can assign a weighted value to each video in the set of videos. Furthermore, the ranking component 304 can modify a weighted value for a particular video in the set of videos based on a set of fingerprints (e.g., a set of sub-fingerprints) related to a portion of a consumed video and/or a set of other fingerprints (e.g., a set of other sub-fingerprints) related to the particular video in the set of videos from the fingerprint component 106.

For example, the ranking component 304 can modify a weighted value for a particular video in the set of videos based on a comparison between the set of fingerprints (e.g., the set of sub-fingerprints) and the set of other fingerprints (e.g., the set of other sub-fingerprints). In an aspect, the ranking component 304 can modify a weighted value for a particular video in the set of videos based on a comparison between a set of video fingerprints (e.g., a set of video sub-fingerprints) related to the portion of the consumed video and a set of other video fingerprints (e.g., a set of other video sub-fingerprints) related to the particular video in the set of videos. Additionally, the ranking component 304 can further modify a weighted value for the particular video in the set of videos based on a comparison between a set of audio fingerprints (e.g., a set of audio sub-fingerprints) related to the portion of the consumed video and a set of other audio fingerprints (e.g., a set of other audio sub-fingerprints) related to the particular video in the set of videos. As such, the ranking component 304 can rank one or more videos in a set of videos (e.g., a set of recommended videos, a filtered set of videos, a filtered set of recommended videos, etc.) based on a weighted value assigned to each of the one or more videos in the set of videos. Therefore, video content that is more unique than previously consumed video content can be recommended to a user before video content that is less unique than previously consumed video content.

Figure 4:
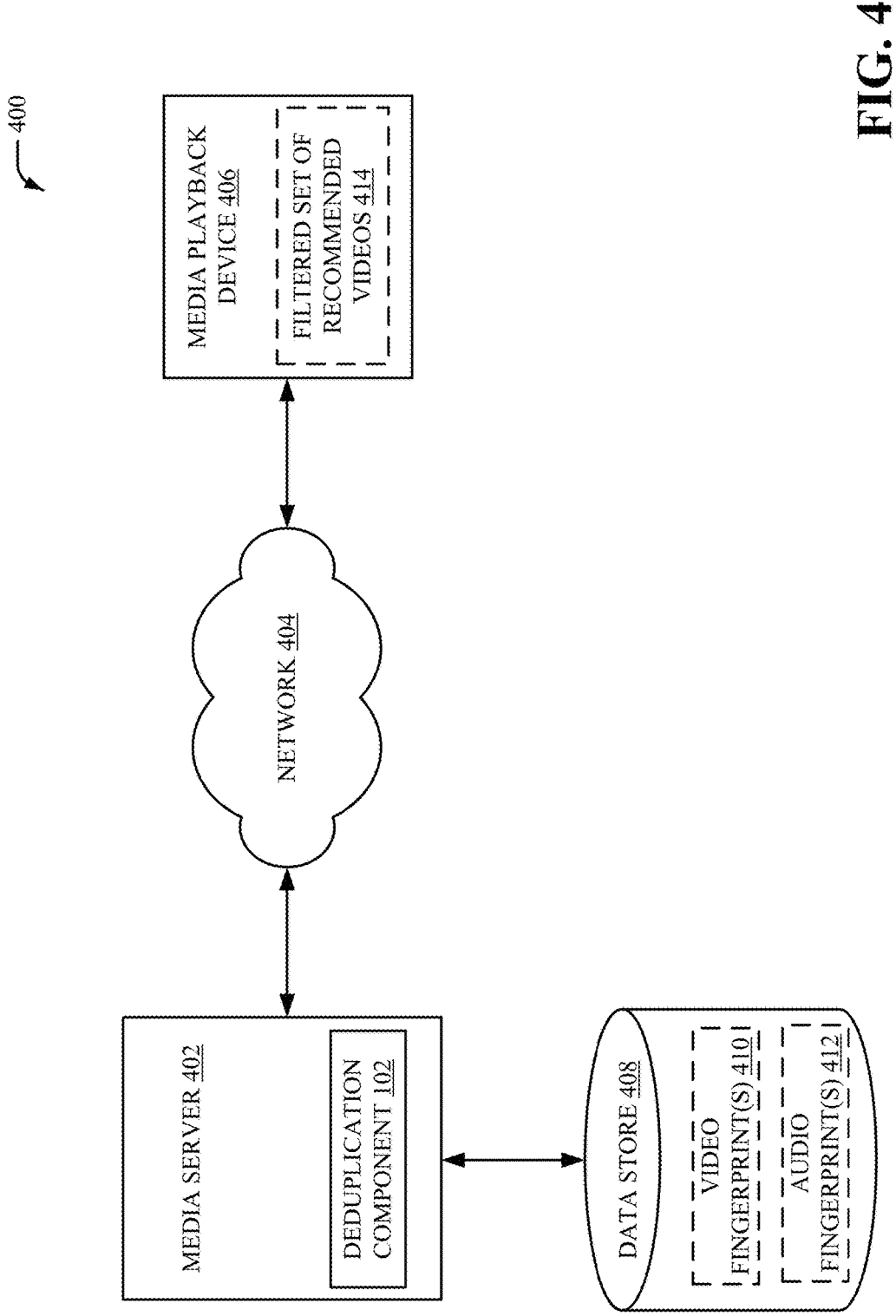
FIG. 4 illustrates a high-level block diagram of a system for recommending media content within a viewing session based on fingerprint matching, in accordance with various aspects and implementations described herein.

FIG. 4 illustrates a non-limiting implementation of a system 400 in accordance with various aspects and implementations of this disclosure. The system 400 includes a media server 402, a network 404, a media playback device (e.g., a media capable device, a user device, etc.) 406 and a data store 408. The media server 402 includes at least the deduplication component 102. The deduplication component 102 can include the media component 104, the fingerprint component 106, the recommendation component 108, the consumption component 202, the viewing session component 204, the filtering component 302 and/or the ranking component 304, each of which can respectively function as more fully disclosed herein. The data store 408 includes video fingerprint(s) 410 and/or audio fingerprint(s) 412. The media playback device 406 can be configured to present (e.g., display) a filtered set of recommended videos 414. In an aspect, the media server 402 and/or the data store 408 can be associated with a content provider (e.g., a media content provider). In another aspect, the media playback device 406 can be associated with a content consumer (e.g., a user, a user identity, etc.). The media playback device 406 can include, but is not limited to, a cellular phone (e.g., a smart phone), a tablet, a personal computer (PC), a desktop computer, a laptop computer, an interactive television, an internet-connected television, a set-top box, a streaming media device, a personal digital assistant (PDA), an electronic reader (e-reader), a camera, a portable computing device, a gaming device, another media capable device, etc.

The media server 402 can be communicably coupled to the media playback device 406 via the network 404. The network 404 can include one or more networks. For example, network 404 can include one or more wired networks and/or one or more wireless networks, including but not limited to, a cellular network, a wide area network (WAN, e.g., the Internet), a local area network (LAN) and/or a personal area network (PAN). The media server 402 (e.g., the deduplication component 102) can generate the filtered set of recommended videos 414 and/or transmit the filtered set of recommended videos 414 via the network 404. As such, the media playback device 406 can receive the filtered set of recommended videos 414 via virtually any desired wired or wireless technology, including, for example, cellular, WAN, wireless fidelity, etc.

In an aspect, the media server 402 can provide one or more media streams (e.g., one or more video streams, video content, one or more video files, etc.) to the media playback device 406 (e.g., via the network 404). As such, in an aspect, the filtered set of recommended videos 414 can be presented (e.g., displayed) in connection with (e.g., alongside) the one or more media streams. In one embodiment, the network 404 includes the Internet and the media server 402 and/or the data store 408 provides content (e.g., video content) specified by an Internet site (e.g., a World Wide Web site). In another embodiment, the network 404 includes a LAN and the media server 402 is a LAN server or a storage device containing media files (e.g., video files). In yet another embodiment, the media server 402 and/or the data store 408 is a database (e.g. a file system or a storage device) that is situated locally (e.g., with or on) the media playback device 406 and/or stores media content (e.g., media content downloaded from a Web site).

The media server 402 (e.g., the deduplication component 102, the media component 104, etc.) can determine a portion of a consumed video that is consumed by a user (e.g., during a viewing session) via the media playback device 406. Furthermore, the media server 402 (e.g., the deduplication component 102, the fingerprint component 106, etc.) can determine a set of video sub-fingerprints associated with the portion of the consumed video and/or a set of other video sub-fingerprints associated with a video included in a set of recommended videos based on the video fingerprint(s) 410. Additionally, the media server 402 (e.g., the deduplication component 102, the fingerprint component 106, etc.) can determine a set of audio sub-fingerprints associated with the portion of the consumed video and/or a set of other audio sub-fingerprints associated with the video included in the set of recommended videos based on the audio fingerprint(s) 412. In an aspect, the media server 402 (e.g., the deduplication component 102, the media component 104, the recommendation component 108, etc.) can receive and/or generate the set of recommended videos. Furthermore, the media server 402 (e.g., the deduplication component 102, the recommendation component 108, etc.) can filter the set of recommended videos to generate the filtered set of recommended videos 414 based on a comparison between the set of video sub-fingerprints and the set of other video sub-fingerprints and/or a comparison between the set of audio sub-fingerprints and the set of other audio sub-fingerprints. Therefore, content of the filtered set of recommended videos 414 can be different than one or more media streams provided by the media server 402 during a viewing session. Accordingly, the media server 402 can avoid providing duplicate media content (e.g., in the filtered set of recommended videos 414) to the media playback device 406 (e.g., the media server 402 can avoid recommending media content which was previously consumed on the media playback device 406).

Figure 5:
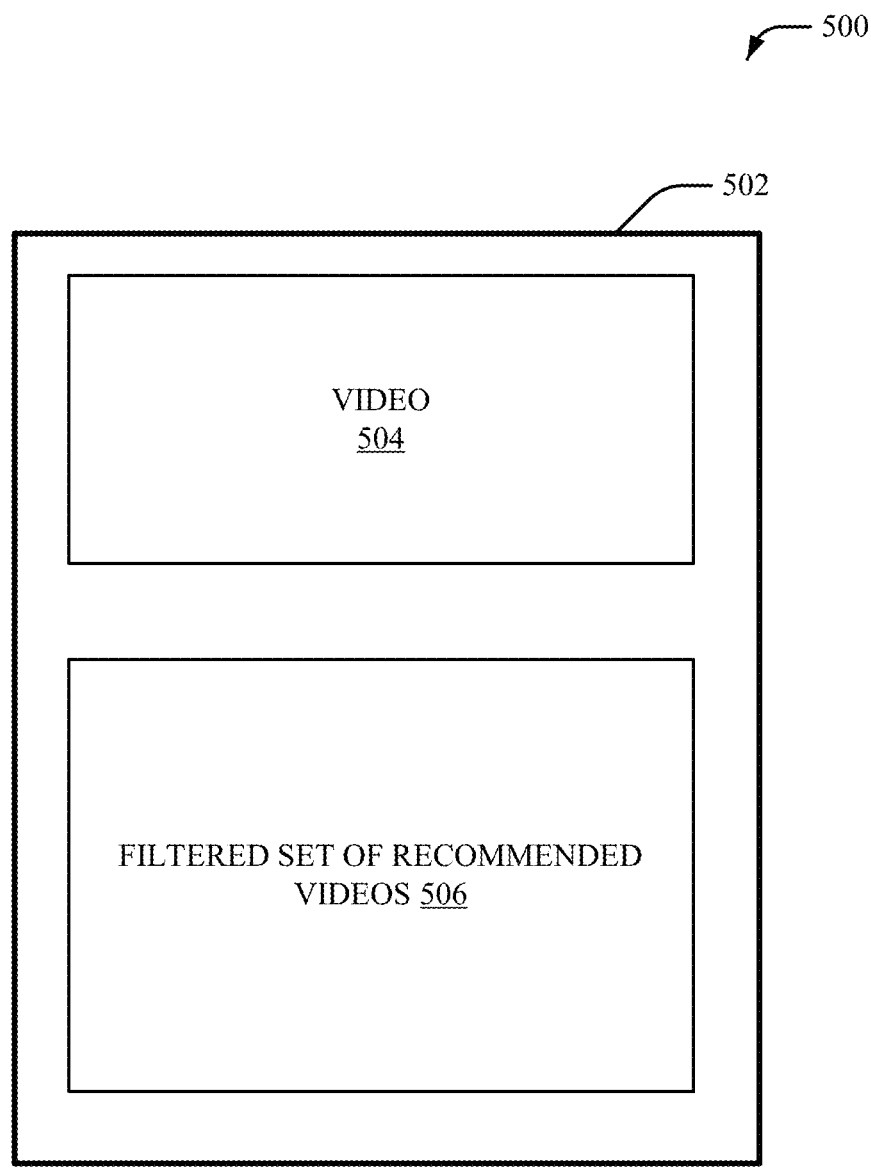
FIG. 5 illustrates an example user device for receiving recommended media content within a viewing session based on fingerprint matching, in accordance with various aspects and implementations described herein.

FIG. 5 illustrates a non-limiting implementation of a system 500 in accordance with various aspects and implementations of this disclosure. The system 500 includes a device 502. In an aspect, the device 502 can include a graphical user interface to present (e.g., display) at least a video 504 and/or a filtered set of recommended videos 506. In one example, the device 502 can correspond to the media playback device 406. As such, the device 502 can include, but is not limited to, a cellular phone (e.g., a smart phone), a tablet, a personal computer (PC), a desktop computer, a laptop computer, an interactive television, an internet-connected television, a set-top box, a streaming media device, a personal digital assistant (PDA), an electronic reader (e-reader), a camera, a portable computing device, a gaming device, another media capable device, etc. In another aspect, the device 502 can be associated with a content consumer (e.g., a user, a user identity, etc.).

The device 502 can be configured to present (e.g., display) video content (e.g. the video 504). For example, the video 504 can be consumed video (e.g., consumed video content) that is consumed via the device 502 (e.g., by a user associated with the device 502). In an aspect, the video 504 can be user-generated video content and/or user-uploaded video content. In another aspect, the video 504 can be received from a media content provider (e.g., the media server 402) via a network (e.g., the network 404). In one embodiment the filtered set of recommended videos 506 can be presented (e.g., displayed) in connection with the video 504. In an aspect, one or more videos included in the filtered set of recommended videos 506 can be related to the video 504 and/or a previously consumed video (e.g., a video previously consumed via the device 502). For example, the filtered set of recommended videos 506 can be presented in connection with a watch page as a list of related videos. In another embodiment, the filtered set of recommended videos 506 can be presented separate from the video 504. For example, the filtered set of recommended videos 506 can be presented and/or displayed in response to a search (e.g., a keyword search) performed via the device 502.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 6:
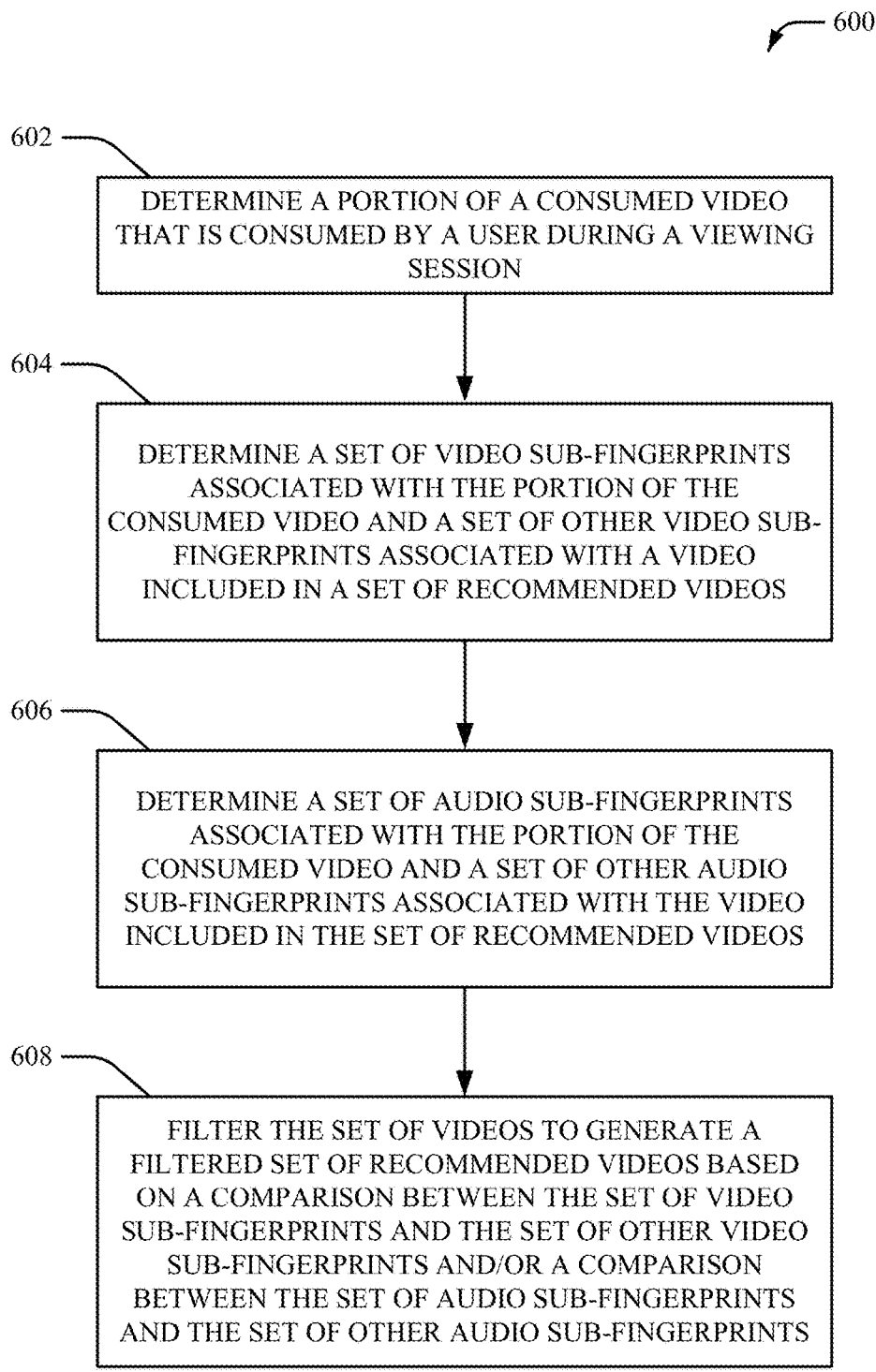
FIG. 6 depicts a flow diagram of an example method for recommending media content within a viewing session based on fingerprint matching, in accordance with various aspects and implementations described herein.

Referring to FIG. 6, there illustrated is a methodology 600 for recommending media content within a viewing session based on fingerprint matching, according to an aspect of the subject innovation. As an example, methodology 600 can be utilized in various applications, such as, but not limited to, deduplication systems, audio and/or video matching systems, content management systems, network systems, computer network systems, communication systems, router systems, server systems, high availability server systems (e.g., Telecom server systems), Web server systems, file server systems, media server systems, disk array systems, powered insertion board systems, cloud-based systems, etc.

At 602, a portion of a consumed video that is consumed by a user during a viewing session is determined (e.g., by a media component 104). For example, a video that is viewed by a user (e.g., a user identity) on a media capable device and/or a time range of the video (e.g., an interval of time associated with the video, a segment of the video, an entire portion of the video, etc.) that is viewed by the user can be determined. A viewing session can include an interval of time that a user spends browsing and/or watching a sequence of videos. In an aspect, a viewing session can include a plurality of viewing sessions. For example, a particular viewing session can be associated with a previous viewing session (e.g., the particular viewing session and the previous viewing session can be considered a single viewing session) in response to a determination that an interval of time between the previous viewing session and the particular viewing session is less than or equal to a predetermined threshold level (e.g., 2 minutes, 10 minutes, 30 minutes, 1 hour, etc.). It is to be appreciated that a viewing session can comprise more than two viewing sessions. In another aspect, a consumed video can be a video that has been recommended (e.g., presented) to the user a certain number of times (e.g., a predetermined number of times). For example, a particular video that has been recommended (e.g., presented) to the user a certain number of times (e.g., three times, five times, etc.) without the user watching the particular video can be considered a consumed video.

At 604, a set of video sub-fingerprints associated with the portion of the consumed video and a set of other video sub-fingerprints associated with a video included in a set of recommended videos is determined (e.g., by a fingerprint component 106). For example, a set of video sub-fingerprints associated with the portion of the consumed video can be determined based on a video fingerprint associated with the consumed video. The set of video sub-fingerprints can be related to an interval of time of the video fingerprint that corresponds to an interval of time of the consumed video (e.g., the portion of the consumed video that is consumed by the user). Furthermore, the set of other video fingerprints associated with the video included in the set of recommended videos can be determined based on another video fingerprint associated with the video included in the set of recommended videos. The set of other video sub-fingerprint can correspond to an entire interval of time (e.g., an entire portion) of the video included in the set of recommended videos.

At 606, a set of audio sub-fingerprints associated with the portion of the consumed video and a set of other audio sub-fingerprints associated with a video included in a set of recommended videos is determined (e.g., by a fingerprint component 106). For example, a set of audio sub-fingerprints associated with the portion of the consumed video can be determined based on an audio fingerprint associated with the consumed video. The set of audio sub-fingerprints can be related to an interval of time of the audio fingerprint that corresponds to an interval of time of the consumed video (e.g., the portion of the consumed video that is consumed by the user). Furthermore, the set of other audio fingerprints associated with the video included in the set of recommended videos can be determined based on another audio fingerprint associated with the video included in the set of recommended videos. The set of other audio sub-fingerprint can correspond to an entire interval of time (e.g., an entire portion) of the video included in the set of recommended videos.

At 608, the set of videos are filtered (e.g., by a recommendation component 108) to generate a filtered set of recommended videos based on a comparison between the set of video sub-fingerprints and the set of other video sub-fingerprints and/or a comparison between the set of audio sub-fingerprints and the set of other audio sub-fingerprints. For example, it can be determined whether the consumed video matches the video in the set of recommended videos by comparing the set of video sub-fingerprints with the set of other video sub-fingerprints. Additionally, it can be further determined (e.g., verified, confirmed, etc.) whether the consumed video matches the video in the set of recommended videos by comparing the set of audio sub-fingerprints with the set of other audio sub-fingerprints. If so, in an aspect, the video in the set of recommended videos can be removed from the set of recommended videos. In another aspect, placement (e.g., ranking, a weighted value, etc.) of the video in the set of recommended videos can be modified.

Figure 7:
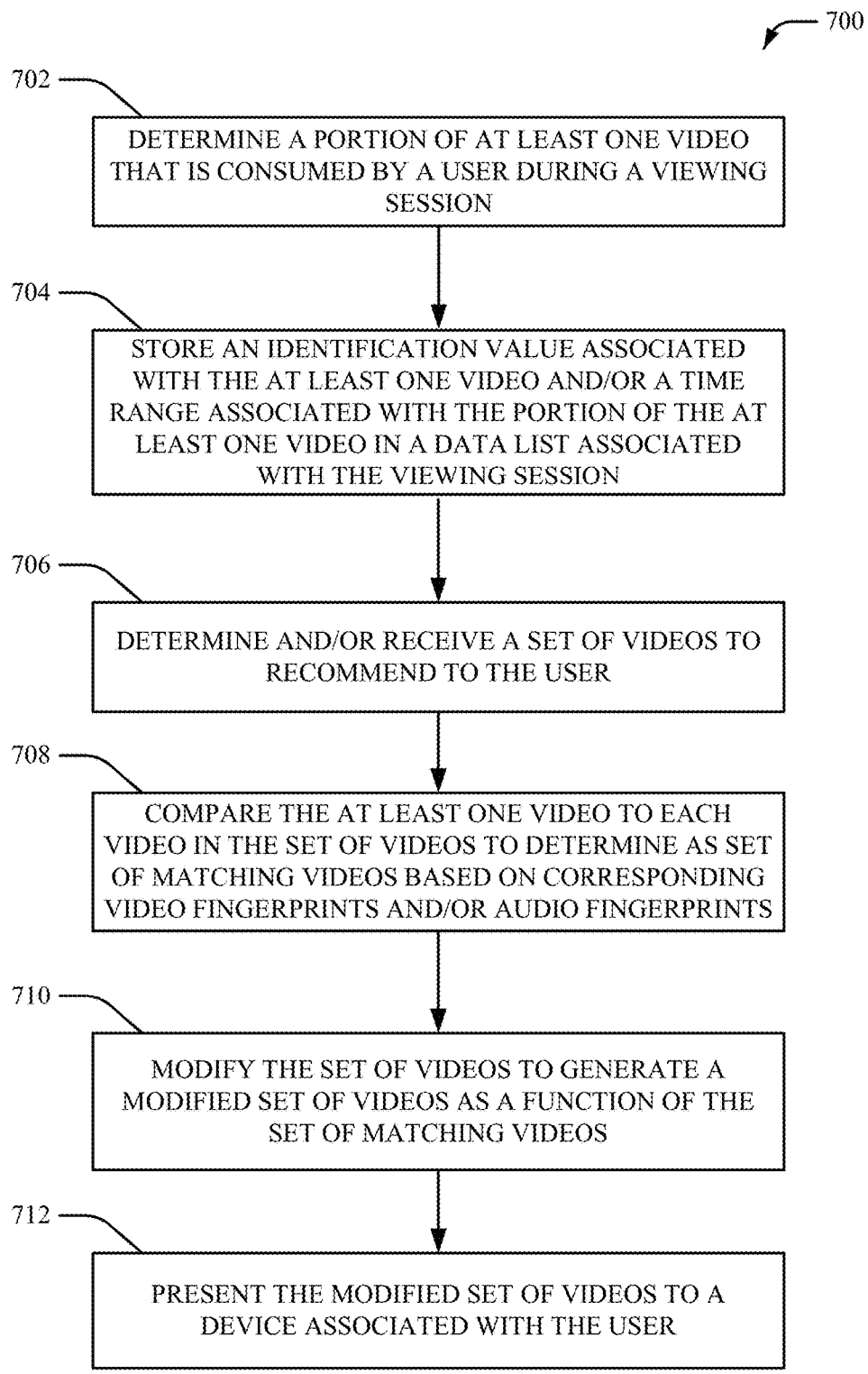
FIG. 7 depicts a flow diagram of another example method for recommending media content within a viewing session based on fingerprint matching, in accordance with various aspects and implementations described herein.

Referring to FIG. 7, there illustrated is an example methodology 700 for recommending media content within a viewing session based on fingerprint matching, according to another aspect of the subject innovation. At 702, a portion of at least one video that is consumed by a user during a viewing session is determined (e.g., by a media component 104). At 704, an identification value associated with the at least one video and/or a time range associated with the portion of the at least one video is stored (e.g., by a media component 104) in a data list associated with the viewing session. For example, an identification value (e.g., an identifier, a tag, etc.) for each video consumed during the viewing session can be stored. Additionally or alternatively, an interval of time related to consumption for each video consumed during the viewing session can be stored. In a non-limiting example, ten videos can be consumed by a user during a particular viewing session. As such, ten identifiers for the ten videos can be stored and/or a time range associated with consumption for each of the ten videos can be stored. However, it is to be appreciated that a different number of videos can be consumed during a viewing session.

At 706, a set of videos to recommend to the user is determined and/or received (e.g., by a media component 104). For example, a set of recommended videos can be generated and/or received. In an aspect, the set of videos can be related to the at least one video (e.g., one or more videos in the set of videos can be related to the at least one video that is consumed by the user).

At 708, the at least one video is compared to each video in the set of videos (e.g., using a fingerprint component 106 and/or a recommendation component 108) to determine a set of matching videos based on corresponding video fingerprints and/or audio fingerprints. For example, a video fingerprint (e.g., a set of video sub-fingerprints) associated with the at least one video can be compared to another video fingerprint (e.g., a set of other video sub-fingerprints) associated with each video in the set of videos. Additionally, an audio fingerprint (e.g., a set of audio sub-fingerprints) associated with the at least one video can be compared to another audio fingerprint (e.g., a set of other audio sub-fingerprints) associated with each video in the set of videos. Accordingly, it can be determined whether the at least one video matches one or more videos in the set of videos.

At 710, the set of videos are modified (e.g., by a recommendation component 108) to generate a modified set of videos as a function of the matching videos. In an aspect, the matching videos can be removed from the set of videos. In another aspect, the matching videos can be ranked lower in the set of videos (e.g., a list of videos associated with the set of videos) as a function of a degree of similarity to the at least one video that is consumed by the user.

At 712, the modified set of videos is presented (e.g., by a recommendation component 108) to a device associated with the user. For example, the modified set of videos can be presented along with a video configured for consumption on the device. In another example, the modified set of videos can be presented in response to a search (e.g., a search request) initiated on the device.

Figure 8:
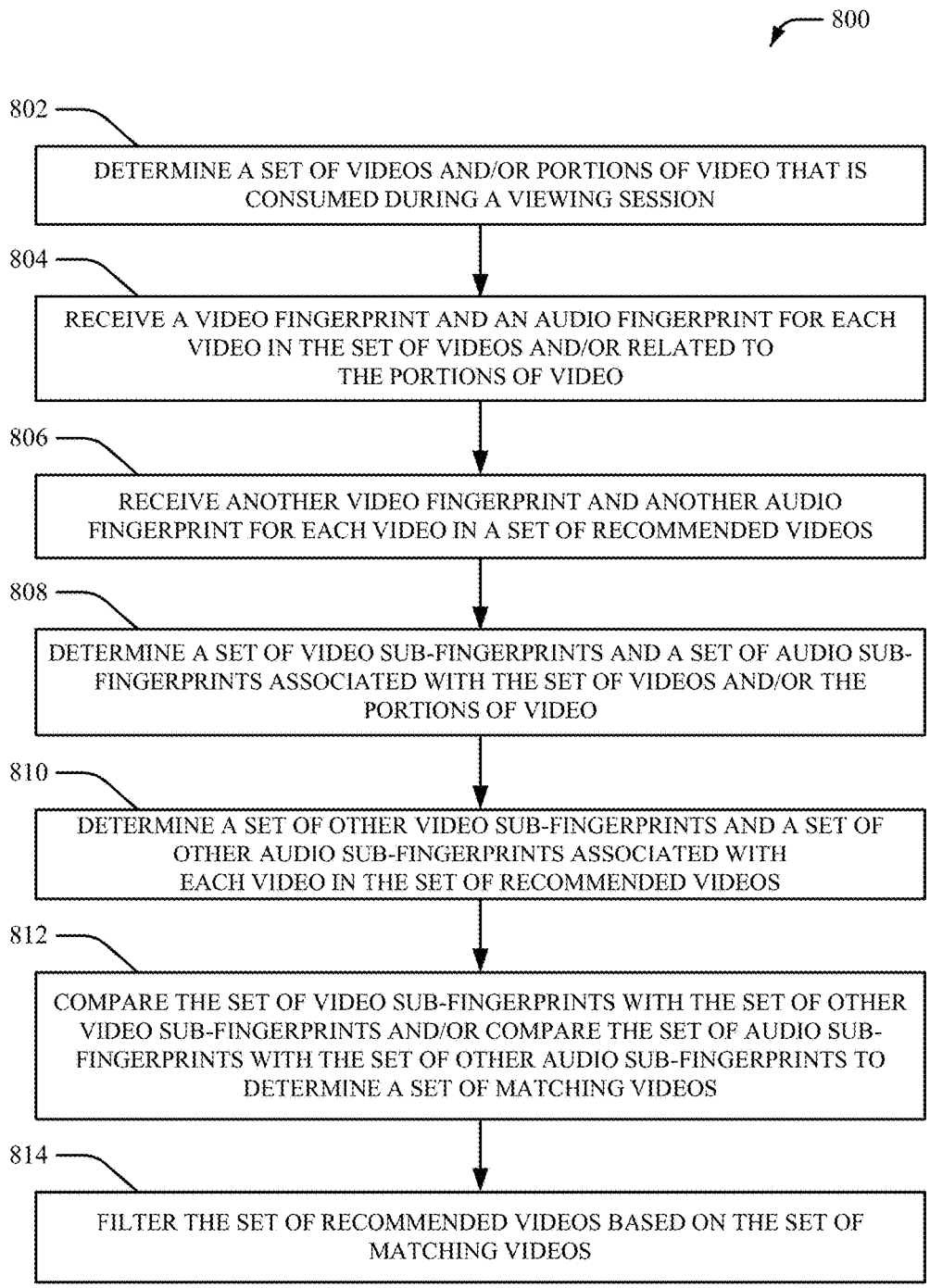
FIG. 8 depicts a flow diagram of an example method for filtering a set of videos, in accordance with various aspects and implementations described herein.

Referring to FIG. 8, there illustrated is another example methodology 800 for filtering a set of videos, according to another aspect of the subject innovation. At 802, a set of videos and/or portions of video that is consumed during a viewing session is determined (e.g., by a media component 104). For example, video content (e.g., an entire video, a portion of a video, etc.) that is consumed on a media capable device associated with a user (e.g., a user identity) can be determined.

At 804, a video fingerprint and an audio fingerprint for each video in the set of videos and/or related to the portions of video are received (e.g., by a fingerprint component 106). For example, a video fingerprint and an audio fingerprint that is stored in a data store (e.g., a database) can be received for each video in the set of videos. Additionally or alternatively, a video fingerprint and an audio fingerprint that is stored in a data store (e.g., a database) can be received for each video related to the portions of video.

At 806, another video fingerprint and another audio fingerprint for each video in a set of recommended videos are received (e.g., by a fingerprint component 106). For example, another video fingerprint and another audio fingerprint that is stored in the data store (e.g., the database) can be received for each video in the set of recommended videos.

At 808, a set of video sub-fingerprints and a set of audio sub-fingerprints associated with the set of videos and/or the portions of video are determined (e.g., by a fingerprint component 106). For example, a set of video sub-fingerprints and a set of audio sub-fingerprints can be determined based on the video fingerprint and the audio fingerprint associated with the set of videos. Additionally, a set of video sub-fingerprints and a set of audio sub-fingerprints can be determined based on the video fingerprint and the audio fingerprint associated with the portions of video.

At 810, a set of other video sub-fingerprints and a set of other audio sub-fingerprints associated with each video in the set of recommended videos are determined (e.g., by a fingerprint component 106). For example, a set of other video sub-fingerprints and a set of other audio sub-fingerprints can be determined based on the other video fingerprint and the other audio fingerprint associated with each video in the set of recommended videos.

At 812, the set of video sub-fingerprints are compared with the set of other video sub-fingerprints and/or the set of audio sub-fingerprints are compared with the set of other audio sub-fingerprints to determine a set of matching videos (e.g., using a recommendation component 108). For example, it can be determined whether a video in the set of videos and/or the portions of video match one or more videos included in the set of recommended videos by comparing the set of video sub-fingerprints with the set of other video sub-fingerprints. Additionally, it can be further determined (e.g., verified, confirmed, etc.) whether a video in the set of videos and/or the portions of video match one or more videos included in the set of recommended videos by comparing the set of audio sub-fingerprints with the set of other audio sub-fingerprints.

At 814, the set of recommended videos is filtered (e.g., using a recommendation component 108) based on the set of matching videos. For example, one or more videos included in the set of matching videos can be removed from the set of recommended videos and/or altered in the set of recommended videos.

Figure 9:
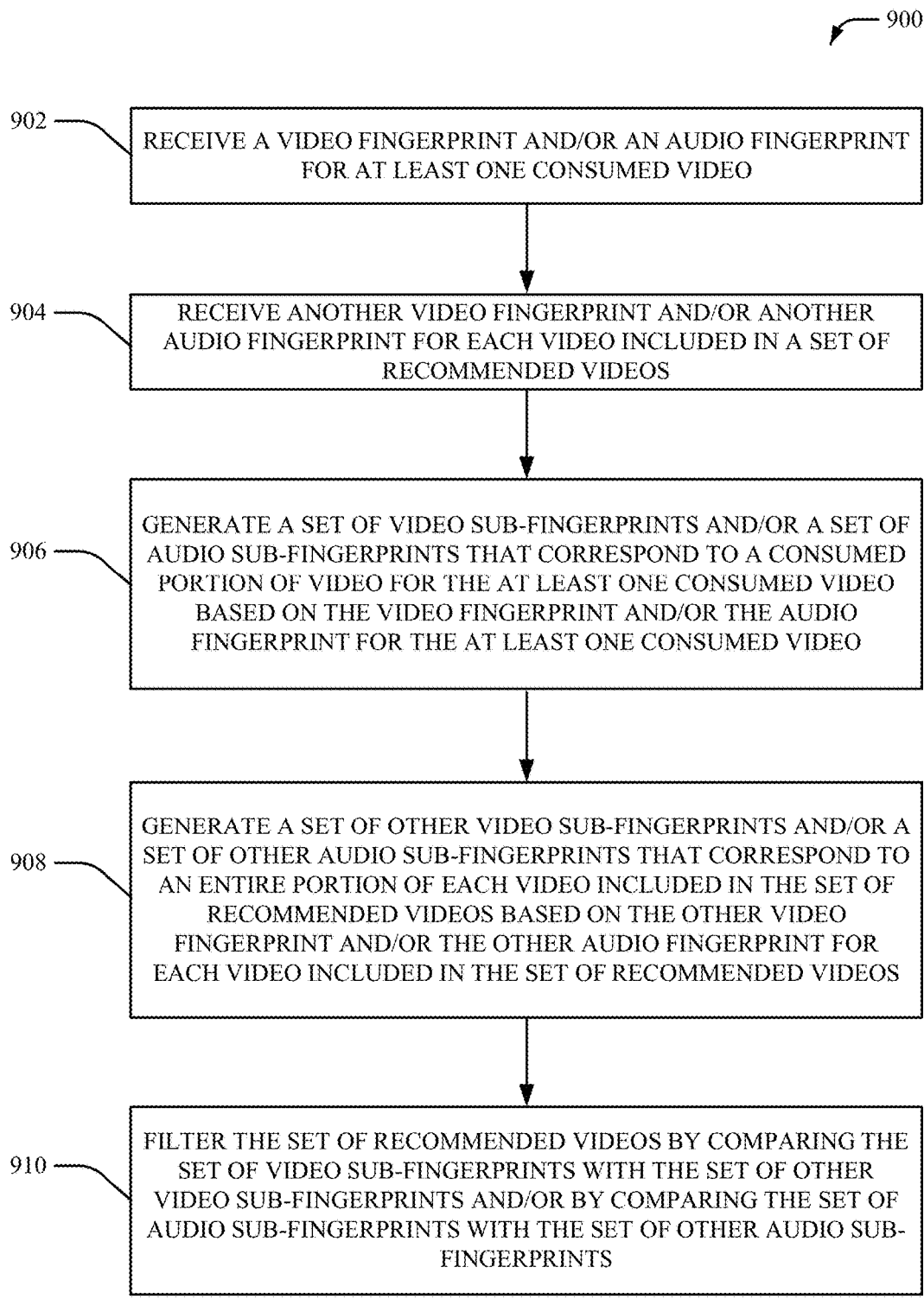
FIG. 9 depicts a flow diagram of an example method for filtering a set of videos based on fingerprint matching, in accordance with various aspects and implementations described herein.

Referring to FIG. 9, there illustrated is an example methodology 900 for filtering a set of videos based on fingerprint matching, according to another aspect of the subject innovation. At 902, a video fingerprint and/or an audio fingerprint for at least one consumed video is received (e.g., by a fingerprint component 106). At 904, another video fingerprint and/or another audio fingerprint for each video included in a set of recommended videos is received (e.g., by a fingerprint component 106). At 906, a set of video sub-fingerprints and/or a set of audio sub-fingerprints that correspond to a consumed portion of video for the at least one consumed video is generated (e.g., by a fingerprint component 106) based on the video fingerprint and/or the audio fingerprint for the at least one consumed video. At 908, a set of other video sub-fingerprints and/or a set of other audio sub-fingerprints that correspond to an entire portion of each video included in the set of recommended videos is generated (e.g., by a fingerprint component 106) based on the other video fingerprint and/or the other audio fingerprint for each video included in the set of recommended videos. At 910, the set of recommended videos is filtered (e.g., using a recommendation component 108) by comparing the set of video sub-fingerprints with the set of other video sub-fingerprints and/or by comparing the set of audio sub-fingerprints with the set of other audio sub-fingerprints.

Figure 10:
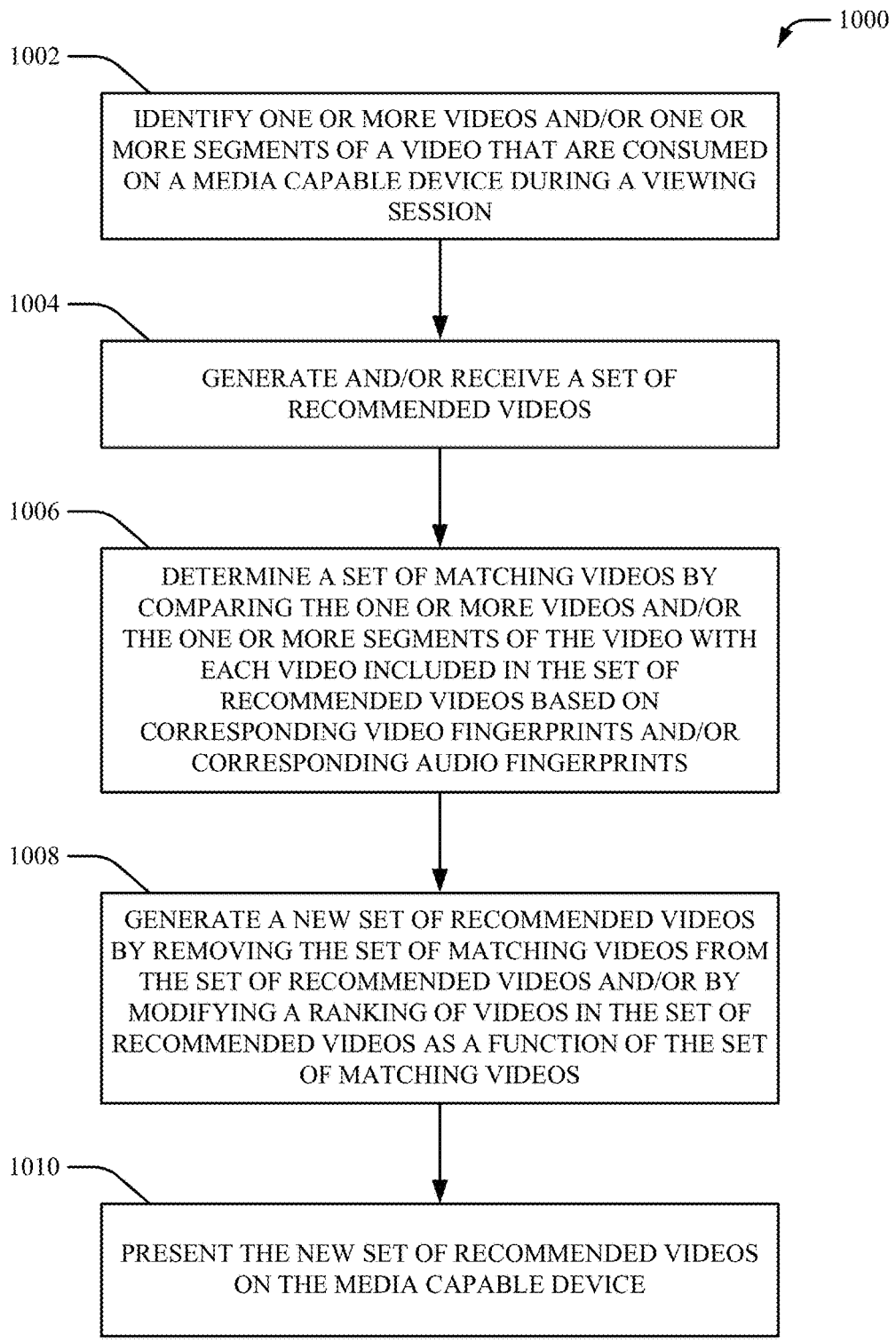
FIG. 10 depicts a flow diagram of an example method for recommending a set of videos, in accordance with various aspects and implementations described herein.

Referring to FIG. 10, there illustrated is an example methodology 1000 for recommending a set of videos, according to another aspect of the subject innovation. At 1002, one or more videos and/or one or more segments of a video that are consumed on a media capable device during a viewing session are identified (e.g., by a media component 104). At 1004, a set of recommended videos are generated and/or received (e.g., by a media component 104). At 1006, a set of matching videos are determined (e.g., using a fingerprint component 106 and/or a recommendation component 108) by comparing the one or more videos and/or the one or more segments of the video with each video included in the set of recommended videos based on corresponding video fingerprints and/or corresponding audio fingerprints. At 1008, a new set of recommended videos is generated (e.g., using a recommendation component 108) by removing the set of matching videos from the set of recommended videos and/or by modifying a ranking of videos in the set of recommended videos as a function of the set of matching videos. At 1010, the new set of recommended videos are presented (e.g., using a recommendation component 108) on the media capable device.

Figure 11:
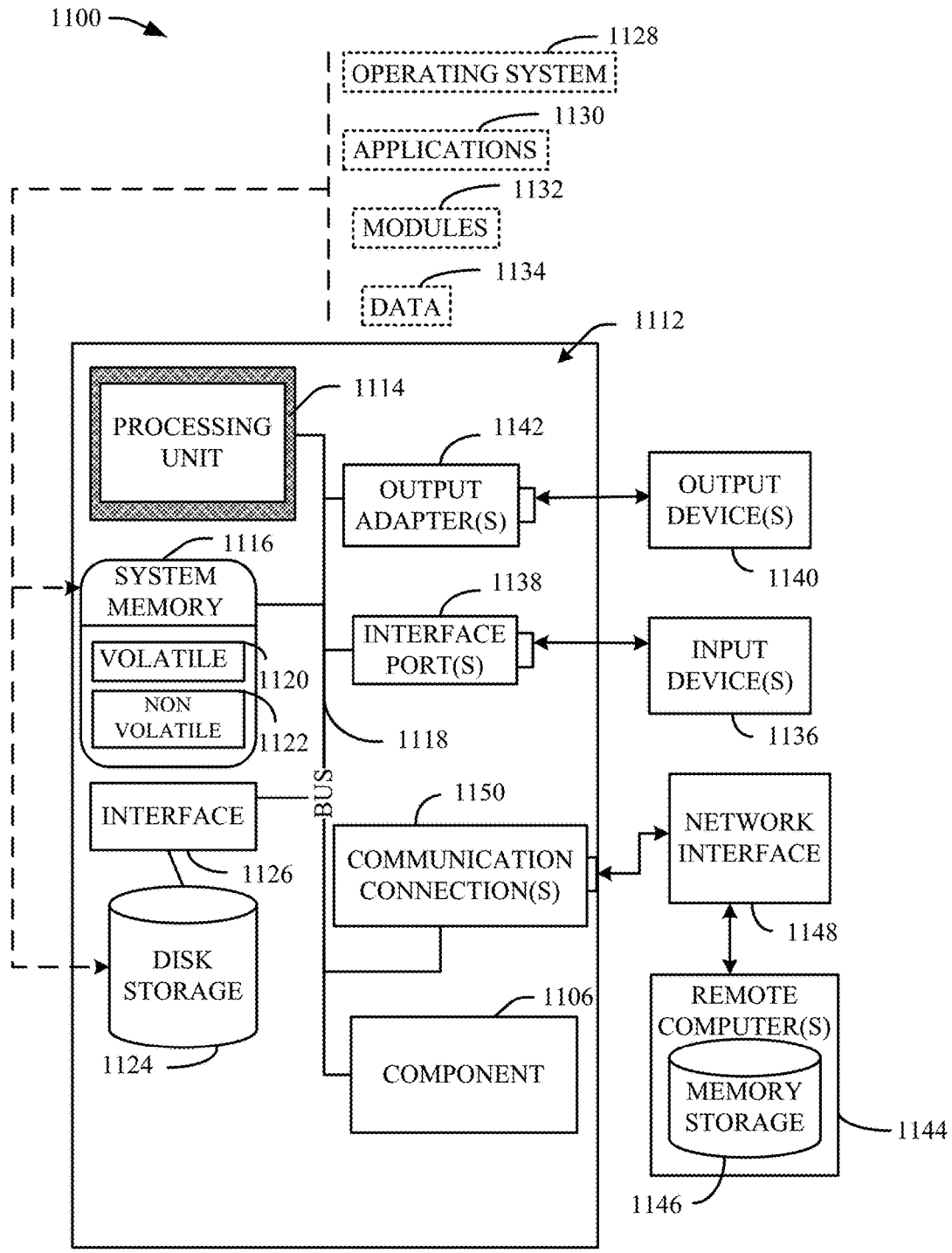
FIG. 11 is a schematic block diagram illustrating a suitable operating environment.
Figure 12:
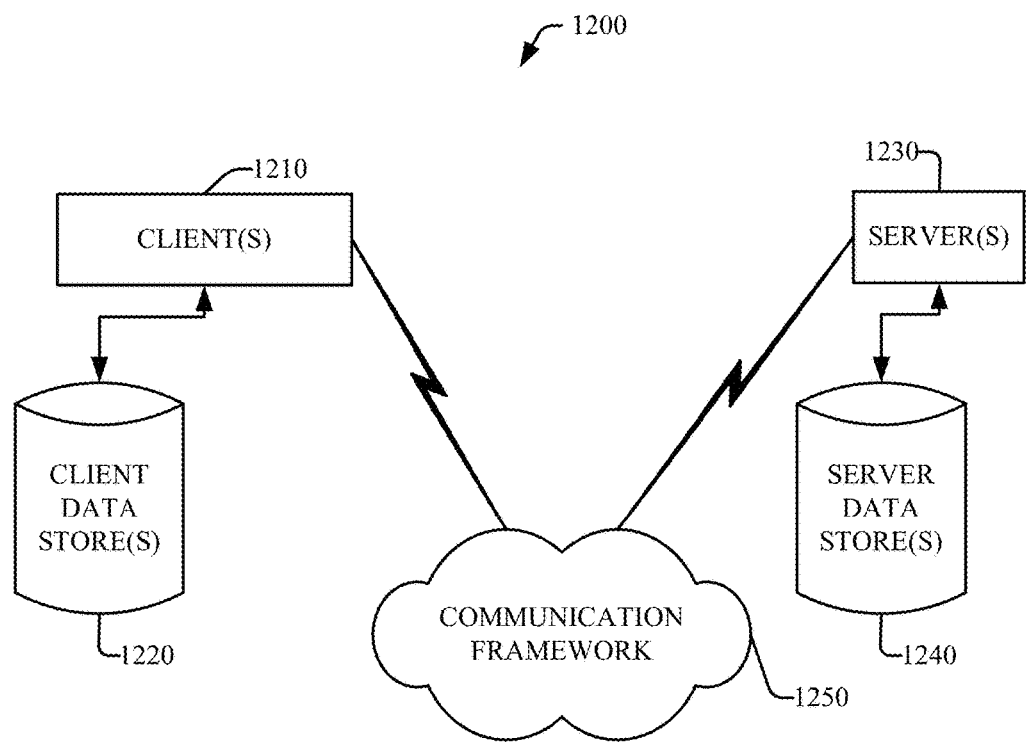
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-5. In accordance with various aspects and implementations, the computer 1112 can be used to recommend media content within a viewing session based on fingerprint matching. In certain exemplary embodiments, the computer 1112 includes a component 1106 (e.g., the deduplication component 102) that can contain, for example, a media component, a fingerprint component, a recommendation component, a consumption component, a viewing session component, a filtering component and/or a ranking component, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., deduplication component, media component, fingerprint component, recommendation component, consumption component, viewing session component, filtering component, ranking component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system for recommending a video to a user during a viewing session, comprising:
    a processor; and
    a memory communicatively coupled to the processor, the memory having stored therein computer-executable instructions, comprising:
        a media component configured to determine respective consumed portions of at least one consumed video that is consumed by the user during the viewing session;
        a fingerprint component configured to, during the viewing session:
            determine respective sets of sub-fingerprints associated with the consumed portions, and
            determine respective sets of other sub-fingerprints associated with recommended videos included in a set of recommended videos; and
        a recommendation component configured to, during the viewing session:
            assign respective similarity scores to the recommended videos indicative of degrees of similarity between the recommended videos and the consumed portions based on comparisons between the respective sets of sub-fingerprints and the respective sets of other sub-fingerprints,
            filter the set of recommended videos to generate a filtered set of recommended videos based on the respective similarity scores by removing at least one recommended video from the set of recommended videos that has an assigned degree of similarity indicating a match to at least one of the consumed portions,
            assign respective ranks to the recommended videos in the set of filtered recommended videos based on the respective similarity scores, and
            place the recommended videos in the set of filtered recommended videos in an order according to the assigned respective ranks,
            wherein the recommendation component assigns a higher rank to a recommended video having an assigned similarity score indicating that the recommended video is more different in comparison to the consumed portions and assigns a lower rank to a second recommended video having an assigned similarity score indicating that the second recommended video is less different in comparison to the consumed portions.

2. The system of claim 1, wherein the set of recommended videos is related to the consumed video.

3. The system of claim 1, wherein the respective sets of sub-fingerprints comprise at least one of video sub-fingerprints or audio sub-fingerprints, and the respective sets of other sub-fingerprints comprise at least one of other video sub-fingerprints or other audio sub-fingerprints.

4. The system of claim 1, wherein the recommendation component is further configured to present the filtered set of recommended videos in the ranked order during the viewing session.

5. The system of claim 1, wherein a consumed video is a video that has at least a portion watched by the user.

6. The system of claim 1, wherein the media component is further configured to determine, during the viewing session, that a video is a consumed video in response to the video having been recommended to the user a certain number of times without the user having watched any portion of the video.

7. A method for recommending a video to a user during a viewing session on a media platform, comprising:
    determining, by a system including a processor during the user viewing session, respective consumed portions of at least one consumed video that is consumed by the user during the viewing session;
    determining, by the system during the viewing session, respective sets of sub-fingerprints associated with the consumed portions;
    determining, by the system during the viewing session, respective sets of other sub-fingerprints associated with recommended videos included in a set of recommended videos;
    assigning, by the system during the viewing session, respective similarity scores to the recommended videos indicative of degrees of similarity between the recommended videos and the consumed portions based on comparisons between the respective sets of sub-fingerprints and the respective sets of other sub-fingerprints;

filtering, by the system during the viewing session, the set of recommended videos to generate a filtered set of recommended videos based on the respective similarity scores, wherein the filtering comprises removing at least one recommended video from the set of recommended videos that has an assigned degree of similarity indicating a match to at least one of the consumed portions to generate the filtered set of recommended videos;

assigning, by the system during the viewing session, respective ranks to the recommended videos in the set of filtered recommended videos based on the respective similarity scores, and placing, by the system during the viewing session, the recommended videos in the set of filtered recommended videos in an order according to the assigned respective ranks;

wherein a higher rank is assigned to a recommended video having an assigned similarity score indicating that the recommended video is more different in comparison to the consumed portions and a lower rank is assigned to a second recommended video having an assigned similarity score indicating that the second recommended video is less different in comparison to the consumed portions.

8. The method of claim 7, further comprising presenting the filtered set of recommended videos in the ranked order to the user.

9. The method of claim 7, wherein the respective sets of sub-fingerprints comprise at least one of video sub-fingerprints or audio sub-fingerprints and the respective sets of other sub-fingerprints comprise at least one of other video sub-fingerprints or other audio sub-fingerprints.

10. A non-transitory computer readable medium having instructions stored thereon that, in response to execution, cause a system including a processor to perform operations for recommending a video to a user during a viewing session on a content platform, comprising:

determining, during the user viewing session, respective consumed portions of at least one consumed video that is consumed by the user during the viewing session;

determining, during the viewing session, respective sets of sub-fingerprints associated with the consumed portions;

determining, during the viewing session, respective sets of other sub-fingerprints associated with recommended videos included in a set of recommended videos;

assigning, during the viewing session, respective similarity scores to the recommended videos indicative of degrees of similarity between the recommended videos and the consumed portions based on comparisons between the respective sets of sub-fingerprints and the respective sets of other sub-fingerprints;

filtering, during the viewing session, the set of recommended videos to generate a filtered set of recommended videos based on the respective similarity scores, wherein the filtering comprises removing at least one recommended video from the set of recommended videos that has an assigned degree of similarity indicating a match to at least one of the consumed portions to generate the filtered set of recommended videos;

assigning, during the viewing session, respective ranks to the recommended videos in the set of filtered recommended videos based on the respective similarity scores, and placing, during the viewing session, the recommended videos in the set of filtered recommended videos in an order according to the assigned respective ranks;

wherein a higher rank is assigned to a recommended video having an assigned similarity score indicating that the recommended video is more different in comparison to the consumed portions and a lower rank is assigned to a second recommended video having an assigned similarity score indicating that the second recommended video is less different in comparison to the consumed portions.

11. The system of claim 6, wherein the media component is further configured to determine, during the viewing session, the certain number of times based upon a ranking assigned to the recommended video.

* * * * *